S. L. DENNIS.
COMBINED HANDSAW AND SQUARE.
APPLICATION FILED OCT. 12, 1916.
1,261,219.
Patented Apr. 2, 1918.
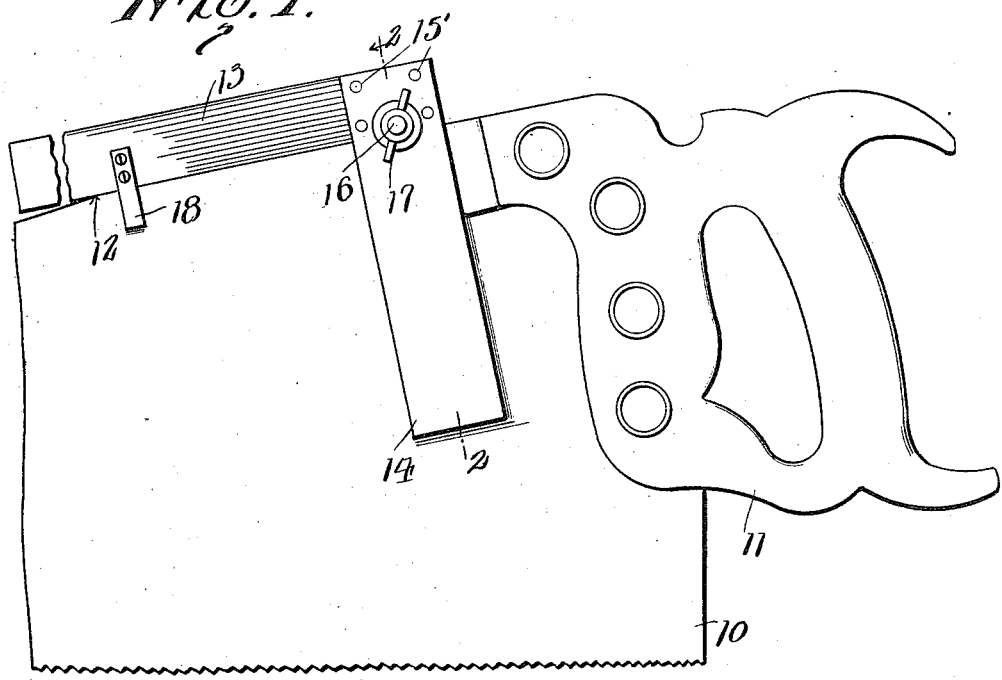
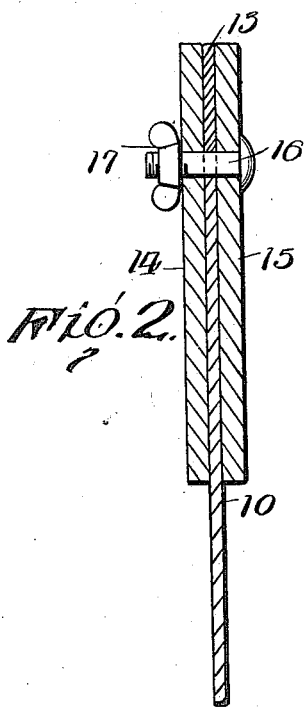
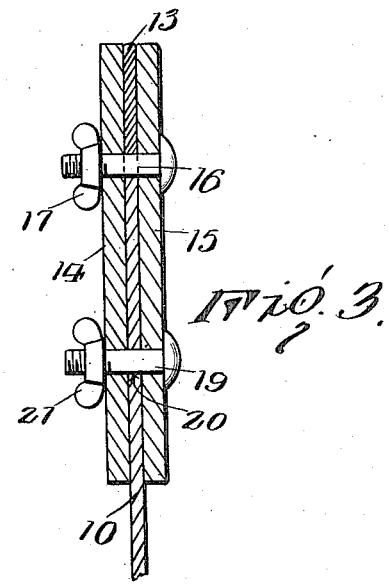
Samuel L. Dennis
Inventor
By Geo. P. Kimmel
Attorney

UNITED STATES PATENT OFFICE.

SAMUEL L. DENNIS, OF SUFFOLK, VIRGINIA.

COMBINED HANDSAW AND SQUARE.

1,261,219.  Specification of Letters Patent.  Patented Apr. 2, 1918.

Application filed October 12, 1916. Serial No. 125,212.

*To all whom it may concern:*

Be it known that I, SAMUEL L. DENNIS, a citizen of the United States, and resident of Suffolk, in the county of Nansemond and State of Virginia, have invented certain new and useful Improvements in Combined Handsaws and Squares, of which the following is a specification.

The present invention relates to compound tools and has particular reference to new and useful improvements in combined hand saws and squares.

An object of my invention is to provide a square for detachable association with a hand saw, to afford means for laying off markings upon objects to be cut by the saw whereby to facilitate the work of a carpenter or the like and render more accurate the use of the saw.

Another object of my invention is to provide a square of the class described which may be detachably associated with a hand saw whereby the same may be used on the saw or detached therefrom.

A further object of my invention is to provide a device of the character described which is simple in construction, strong and durable, effective in operation and cheap to manufacture.

Other objects and advantages to be derived from the use of my improved combination hand saw and square will appear from the following detailed description and the claim, taken with an inspection of the accompanying drawing, in which:

Figure 1 is a fragmental side elevational view of a portion of a saw showing my improved square applied thereto;

Fig. 2 is a vertical sectional view taken on the line 2—2 of Fig. 1; and

Fig. 3 is a similar view showing a modified form of fastening means.

Referring more particularly to the drawing, wherein similar characters of reference designate like and corresponding parts throughout the various views, 10 designates the blade of a hand saw and 11 the handle thereof. The back of the saw is designated 12 and may be that of any saw, but preferably a sway-back. Of course, I do not limit my invention to use in connection with sway-back saws.

The square of my invention includes a relatively long main blade 13 of a thickness equaling that of the blade 10 of the saw. The main blade 13 is connected to the blades 14 and 15 by means of rivets 15', said blades 14 and 15 being mounted on either side of the main blade 13 in spaced relation to each other to receive the blade 10 of the saw therebetween.

A fastening bolt 16 passes through the main blade 13, and blades 14 and 15 adjacent their juncture, said bolt having a wing nut 17 on one end thereof. A pair of lugs 18 is mounted on the main blade 13 adjacent the free end thereof, said lugs being adapted to embrace the upper marginal edge of the blade 10 to prevent disalinement of the main square blade 13 and the saw blade 10.

Referring to Fig. 3 I have provided a modified form of my invention wherein an additional securing bolt 19 is provided extending through the blades 14 and 15 and the blade 10 of the saw, an opening 20 being necessarily provided in the saw. A wing nut 21 serves to clamp the blades 14 and 15 into engagement with the saw blade. The remaining parts of the device are identical with those shown in Figs. 1 and 2 and described hereinbefore.

In use the square may be permitted to remain upon the saw, said square being arranged along one edge of the object to be cut and a line drawn either along the saw or along the other blade of the square. If desired the square may be removed from the saw by loosening the bolt 16, and in the modified form by removing the bolt 19.

Thus it will be seen that in the provision of my improved combination saw and square I have afforded means for facilitating the laying off of markings upon an object to be cut, particular stress being laid upon the novel means of securing the square to the saw, and I desire that it be understood that while I have shown and described this invention as embodying a specific structure, such changes may be made therein as do not depart from the spirit and scope of the invention as claimed.

Having thus fully described my invention, what I claim as new and desire to secure by Letters Patent, is:

A square of the character described including a relatively long main blade adapted to engage a saw, a pair of blades extending at right angles to said main blade, the main blade being rigidly secured intermediate the pair of blades adjacent one end thereof, said pair of blades adapted to engage the sides of a saw blade, a fastening bolt passing through said blades at their point of jointure to rigidly secure the same to a saw blade when desired, and a plurality of lugs mounted on the main blade adjacent the free end thereof adapted to embrace the marginal edge of the saw blades to prevent displacement thereof with the main blade.

In testimony whereof, I affix my signature hereto.

SAMUEL L. DENNIS.

Copies of this patent may be obtained for five cents each, by addressing the "Commissioner of Patents, Washington, D. C."